US009071422B2

(12) United States Patent
Kwon (10) Patent No.: US 9,071,422 B2
(45) Date of Patent: Jun. 30, 2015

(54) ACCESS AUTHENTICATION METHOD FOR MULTIPLE DEVICES AND PLATFORMS

(75) Inventor: Young Min Kwon, Seongnam-si (KR)

(73) Assignee: INNODIS CO., LTD., Seoul (KR)

(*) Notice: Subject to any disclaimer, the term of this patent is extended or adjusted under 35 U.S.C. 154(b) by 500 days.

(21) Appl. No.: 13/452,702

(22) Filed: Apr. 20, 2012

(65) Prior Publication Data

US 2012/0297470 A1 Nov. 22, 2012

(30) Foreign Application Priority Data

Apr. 20, 2011 (KR) .................. 10-2011-0036467
Apr. 16, 2012 (KR) .................. 10-2012-0038885

(51) Int. Cl.
*H04L 29/06* (2006.01)
*H04L 9/08* (2006.01)
*H04L 9/32* (2006.01)

(52) U.S. Cl.
CPC ............ *H04L 9/083* (2013.01); *H04L 9/321* (2013.01); *H04L 63/0807* (2013.01); *H04L 63/0884* (2013.01)

(58) Field of Classification Search
CPC ..... H04L 9/083; H04L 9/321; H04L 63/0807; H04L 63/0884
USPC .......................................................... 726/7
See application file for complete search history.

(56) References Cited

U.S. PATENT DOCUMENTS

| 7,979,899 | B2* | 7/2011 | Guo et al. ................. 726/7 |
| 2005/0091539 | A1* | 4/2005 | Wang et al. .............. 713/201 |
| 2008/0089300 | A1* | 4/2008 | Yee ........................... 370/338 |
| 2010/0269156 | A1* | 10/2010 | Hohlfeld et al. ........... 726/4 |

* cited by examiner

*Primary Examiner* — Jeffrey Pwu
*Assistant Examiner* — Thong Truong
(74) *Attorney, Agent, or Firm* — Rabin & Berdo, P.C.

(57) ABSTRACT

An access authentication method for multiple devices and platforms. Upon receipt of a multiple access request, a source device that has initially registered a user account to a subscribed site requests an authentication key for a target device to a server of the subscribed site, the target device receives an access authentication request together with an authentication key from the source device, when the source device receives the authentication key from an account authentication system, the authentication key being generated in response to an authentication key request from the subscribed site server by the account authentication system, the subscribed site server determines whether there is the registered user account and performs access authentication with the account authentication system, upon receipt of the authentication key from the target device, and the target device receives an access authentication completion notification from the subscribed site server, when the access authentication is completed.

5 Claims, 5 Drawing Sheets

ACCESS AUTHENTICATION METHOD FOR MULTIPLE DEVICES AND PLATFORMS

TECHNICAL FIELD

The present invention relates to a technique for enabling access from a plurality of devices without account registration or input of account-related information and, more particularly, to an access authentication method for multiple devices and platforms.

BACKGROUND ART

In general, when a user joins membership of a specific Internet site or purchases merchandise on an Internet shopping site, the user needs to let his or her real name authenticated and input much personal information. Along with the development of the Internet, numerous sites exist on the Internet. In Korea alone, hundreds of thousands of sites come and go. If an Internet user is prompted to input the user's real name and resident registration number each time the user signs up to a new site, the user's personal information is at the risk of leakage and malicious abuse in many ways by a number of hacking programs prevalent on the Internet.

To prevent information leakage, server systems typically adopt security policies that allow only authenticated users to access the systems. For example, a typical server system assigns an Identifier (ID) and a password to each user. Later, the server system requests input of the ID and password of the user to thereby authenticate the user. That is, the user transmits authentication information which is the ID and password to the server through his or her terminal and the server authenticates the user for access by comparing the received authentication information with pre-registered authentication information.

As more and more smart phones and tablet PCs have been used, individual users tend to possess a plurality of devices. An agreement on access to a specific account is rarely made between such devices. Even though a user uses the same account through different devices, the user should perform an authentication procedure by inputting an ID and a password each time the user switches from one device to another. Especially as devices and platforms get diverse, when a specific service is used through a plurality of devices and platforms, account registration and access authentication are required for each device or platform, which increases user inconvenience.

To mitigate user inconvenience, personal information such as an ID and a password can be stored in the form of cookie information in each device. However, the cookie information may be applied only within a specific application and is vulnerable to hacking. Therefore, the risk of leakage of the personal information is high.

DISCLOSURE

Technical Problem

An object of the present invention devised to solve the problem lies on an access authentication method for multiple devices and platforms, which when a user additionally registers to or logs in to a specific site through other devices or platforms after registering an account to the specific site through a specific device, enables the user to readily register to or access the specific site using an assigned temporary authentication key through other devices or platforms simply by manipulation of the specific device as a source device, in order to facilitate access from multiple devices and avoid the hacking risk of personal information.

Technical Solution

The object of the present invention can be achieved by providing an access authentication method for multiple devices and platforms, in which upon receipt of a multiple access request, a source device that has initially registered a user account to a subscribed site requests an authentication key for a target device to a server of the subscribed site, the target device receives an access authentication request together with an authentication key from the source device, when the source device receives the authentication key from an account authentication system, the authentication key being generated in response to an authentication key request from the subscribed site server by the account authentication system, the subscribed site server determines whether there is the registered user account and performs access authentication with the account authentication system, upon receipt of the authentication key from the target device, and the target device receives an access authentication completion notification from the subscribed site server, when the access authentication is completed.

In another aspect of the present invention, provided herein is an access authentication method for multiple devices and platforms, in which upon receipt of a multiple access request, a source device that has initially registered a user account to an account authentication system requests an authentication key for a target device to the account authentication system, an auxiliary device receives the authentication key from the authentication system and transmits an access authentication request together with the authentication key to one of target devices registered to the auxiliary device, and the target device transmits the authentication key to the account authentication system, so that the account authentication system determines whether there is the registered user account and performs access authentication.

In another aspect of the present invention, provided herein is an access authentication method for multiple devices and platforms, in which upon receipt of a multiple access request, a source device that has initially registered a user account to an account authentication system requests an authentication key for a target device to the account authentication system, the source device receives the authentication key from the authentication system and transmits an access authentication request together with the authentication key to a target device connected to the source device, and the target device transmits the authentication key to the account authentication system so that the account authentication system determines whether there is the registered user account and performs access authentication.

In a further aspect of the present invention, provided herein is an access authentication method for multiple devices and platforms, in which when a source device that has initially registered a user account to the account authentication system requests an authentication key for a target device to the account authentication system, the account authentication system generates an authentication key and transmits the authentication key to one of an auxiliary device and the source device, determines whether there is a registered user account corresponding to the authentication key, upon receipt of the authentication key from the target device that has received the authentication key from the source device or the auxiliary device, and transmits an access authentication completion notification to the target device, when the account authentication system detects the registered user account.

Advantageous Effects

According to embodiments of the present invention, a user having devices of a plurality of platforms can connect other devices simply by manipulating a source device that has initially registered an account, without inputting personal information such as an ID or a password through the other devices, while avoiding the hacking risk of the personal information.

DESCRIPTION OF DRAWINGS

The accompanying drawings, which are included to provide a further understanding of the invention, illustrate embodiments of the invention and together with the description serve to explain the principle of the invention.

In the drawings.

Throughout the drawings, the same drawing reference numerals will be understood to refer to the same elements, features and structures.

BEST MODE

Reference will be made to preferred embodiments of the present invention with reference to the attached drawings. Those skilled in the art will appreciate that the present invention may be carried out in other specific ways than those set forth herein. The scope of the present invention is therefore not limited by the embodiments of the present invention.

Figure 1A:
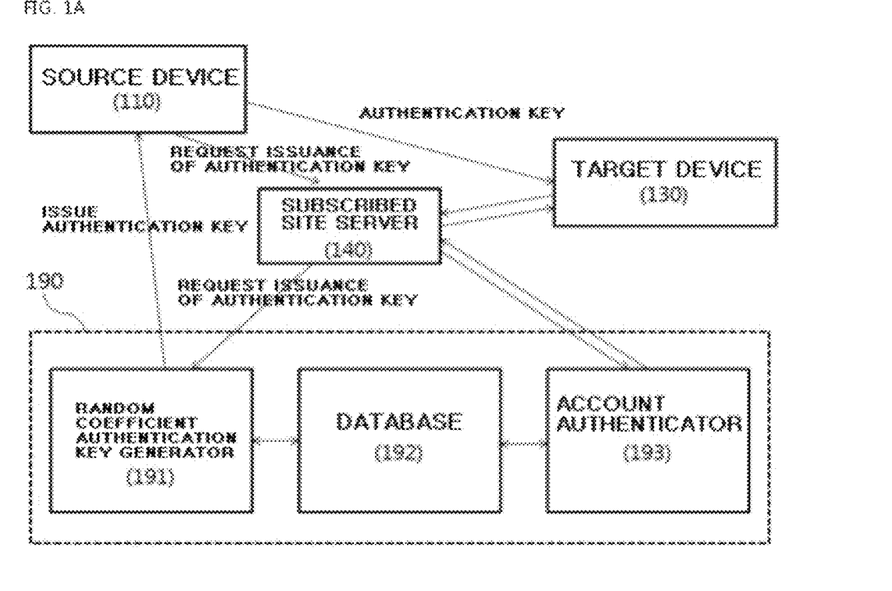
FIG. 1A is a block diagram of an access authentication system for multiple devices and platforms according to an embodiment of the present invention.

FIG. 1A is a block diagram of an access authentication system for multiple devices and platforms according to an embodiment of the present invention.

The term used herein "platform" may refer to a type of Operating System (OS) such as Windows or Linux, or a development environment of a device or software, particularly a resource-limited mobile device environment. On different types of OSs or in different environments, a specific service may be connected through different applications and information may be input in different manners. In this case, it is necessary to facilitate access irrespective of what device or platform a user uses and a requirement for repeated procedures may lead to bad user experience.

Figure 1B:
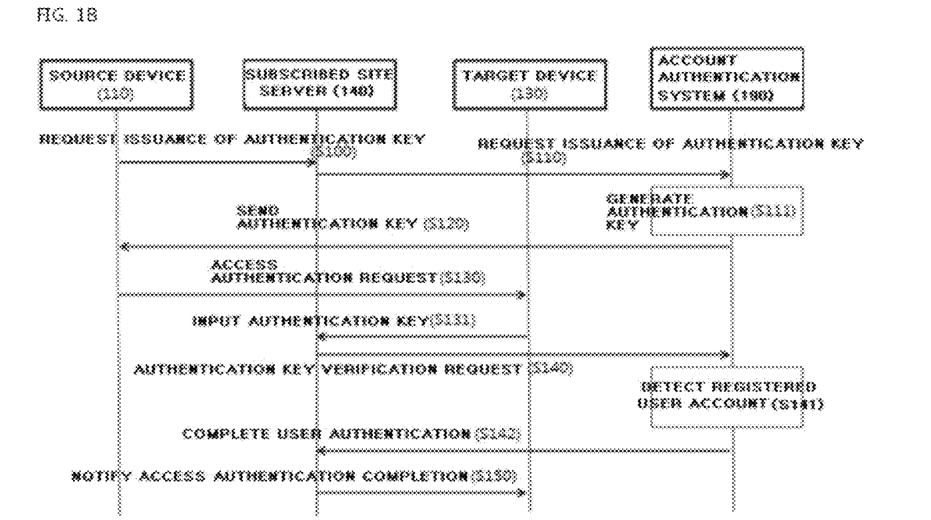
FIG. 1B is a diagram illustrating a signal flow for an access authentication method for multiple devices and platforms in the access authentication system illustrated in FIG. 1A.

A source device 110 is a device which initially registered a specific account to an account authentication system 190. The source device 110 and a target device 130 include a smart TV, a mobile phone, a smart phone, a tablet PC, a Personal Digital Assistant (PDA), a Personal Multimedia Player (PMP), an MP3 player, a laptop computer, a smart card, etc. The source device 110 and the target device 130 have built-in communication modules capable of connecting to Wireless Fidelity (WiFi), Bluetooth, ZigBee, or a $3^{rd}$ Generation (3G) network. In addition, an application for performing an algorithm described with reference to FIG. 1B is installed or built-in in the form of firmware in the target device 110 and the target device 130. When needed, the source device 110 may be connected to the target device 130 in a broadband communication scheme.

Upon receipt of a request for issuing an authentication key from the source device 110, a subscribed site server 140 requests issuance of an authentication key to the account authentication system 190 so that the account authentication system 190 may generate a new authentication key. Upon receipt of an authentication key from the target device 130, the subscribed site server 140 transmits the received authentication key to the account authentication system 190 so that the account authentication system 190 may determine whether there is a registered user account for the target device 130 and performs access authentication, using the authentication key.

The account authentication system 190 includes a random coefficient authentication key generator 191 for generating an authentication key for the target device 130, a database 192 for storing IDs, passwords, and other personal information about users, and an account authenticator 193 for searching for personal information about a user in the database 192 and performing access authentication for the user with the target device 130. The account authentication system 190 is a kind of server that may operate in the same communication scheme as between the source device 110 and the target device 130 or may operate over a dedicated network.

FIG. 1B is a diagram illustrating a signal flow for an access authentication method for multiple devices and platforms in the access authentication system illustrated in FIG. 1A.

Referring to FIG. 1B, upon receipt of a multiple access request, the source device 110 that initially registered a user account to a subscribed site requests an authentication key for the target device 130 to the subscribed site server 140 (S100).

Then the subscribed site server 140 requests issuance of an authentication key to the account authentication system 190 (S110).

The account authentication system 190 generates a new authentication key in response to the request for issuing an authentication key received from the subscribed site server 140 (S111). Attributes may be assigned to the generated authentication key, such as an authentication valid duration, a valid number of times of use, an encrypted mobile phone number, an encrypted email, etc. For example, if the authentication valid duration is 1 hour and the valid number of times of use is 5, the target device 130 can be authenticated using the above same authentication key only up to 5 times. Upon expiration of 1 hour after the authentication key is issued, the target device 130 cannot be user-authenticated even though user authentication has been performed less than 5 times. Information about the authentication valid duration, the valid number of times of use, the encrypted mobile phone number, the encrypted email, a last authentication date and time, and the number of authentications (verifications) that have been performed so far may be stored in the database 192.

Subsequently, the source device 110 receives the authentication key from the account authentication system 190 (S120).

Upon receipt of an access authentication request along with the authentication key from the source device 110 (S130), the target device 130 transmits the authentication key to the subscribed site server 140 (S131) so that the subscribed site server 140 may determine whether there is a registered user account for the target device 130 and perform access authentication through the account authentication system 190.

The subscribed site server 140 transmits an authentication key verification request along with the authentication key to the account authentication system 190 (S140).

The account authentication system 190 checks whether there is the registered user account and performs access authentication (S141). Preferably, upon receipt of the request for issuing an authentication key from the subscribed site server 140, the account authentication system 190 may verify a Uniform Resource Locator (URL) included in the request for issuing an authentication key by searching for the access URL of the user stored in the database 192. The URL from which the user accesses the subscribed site may be stored in the database 192. Even when the subscribed site server 140 requests issuance of an authentication key to the account authentication system 190, the account authentication system 190 determines whether the same URL has been used. Therefore, malicious use of the access authentication system according to the embodiment of the present invention can be prevented.

Upon completion of the access authentication, the account authentication system 190 notifies the subscribed site server 140 of user authentication completion (S142).

Finally, the target device 130 receives a notification indicating access authentication completion from the subscribed site server 140 (S150).

Figure 1C:
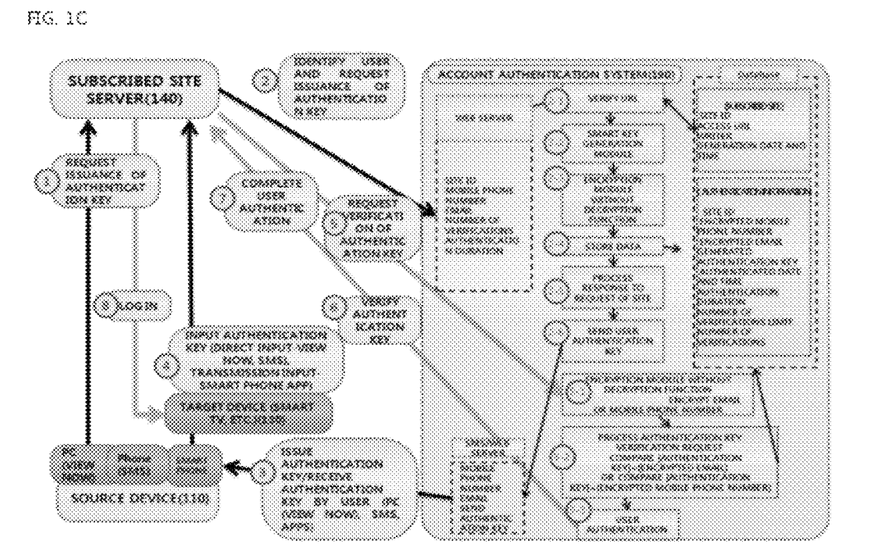
FIG. 1C is a detailed flowchart of the access authentication method illustrated in FIG. 1B.

FIG. 1C is a detailed flowchart of the access authentication method illustrated in FIG. 1B.

In the embodiment of the present invention, the source device 110 and the target device 130 are not related directly to the account authentication system 190 except for issuance of an authentication key. The subscribed site server 190 takes charge of issuing an authentication key and user authentication. A request for issuing an authentication key may include information about an ID of the subscribed site, an email address, a phone number, the number of verifications, and an authentication duration. When a new authentication key is generated, information about an authentication valid duration, the valid number of times of use, an encrypted mobile phone number, an encrypted email, a last authentication date and time, and the number of authentications (verifications) that have been performed so far may be stored in the database 192. In the process of processing a response to the request from the subscribed site, the subscribed site may be notified that a new authentication key will be transmitted to the source device 110, in response to the request for user authentication and issuance of an authentication key.

In the process of processing an authentication key verification request, the account authentication system 190 performs user authentication by checking the presence or absence of the authentication key and expiration or non-expiration of an authentication duration and comparing the site ID and the number of times of use with the database 192.

Figure 2A:
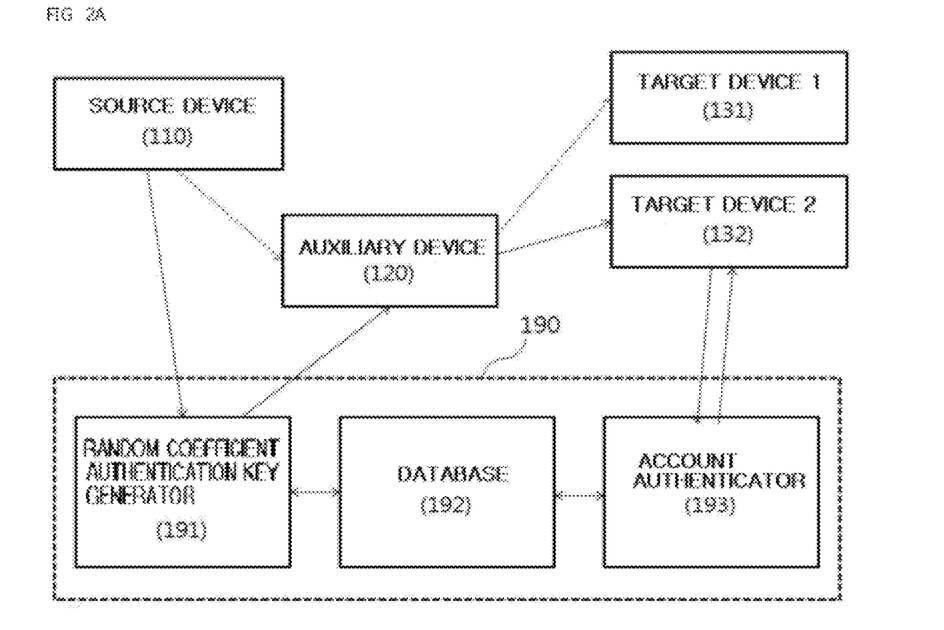
FIG. 2A is a block diagram of an access authentication system for multiple devices and platforms according to another embodiment of the present invention.

FIG. 2A is a block diagram of an access authentication system for multiple devices and platforms according to another embodiment of the present invention.

The source device 110 is a device that has initially registered a specific account to the account authentication system 190. The source device 110, an auxiliary device 120, and target devices 131 and 132 include a mobile phone, a smart phone, a tablet PC, a PDA, a PMP, an MP3 player, a laptop computer, a smart card, etc. Or the source device 110 may be a communication device with a built-in encryption module, which is not equipped with any particular function.

The auxiliary device 120 assists access authentication of the target devices 131 and 132. The auxiliary device 120 may establish a one-to-one connection with the source device 110 or the target devices 131 and 132. The auxiliary device 120 may store a list of target devices to receive an authentication key and the ID of a target device to receive the authentication key with priority in its inner memory, for example, a flash memory or a memory card.

Figure 2B:
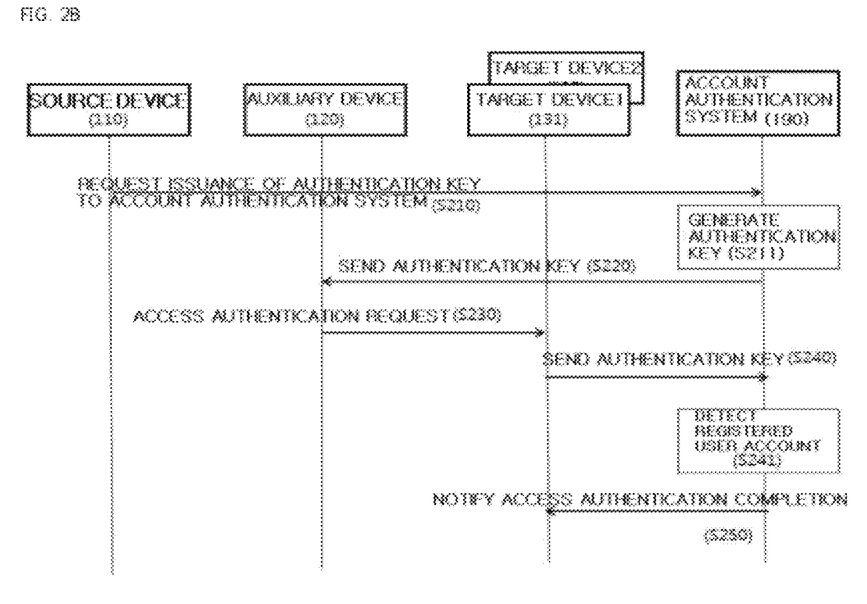
FIG. 2B is a diagram illustrating a signal flow for an access authentication method for multiple devices and platforms in the access authentication system illustrated in FIG. 2A.

The source device 110, the auxiliary device 120, and the target devices 131 and 132 have built-in communication modules that can connect to WiFi, Bluetooth, ZigBee, a 3F network, etc. In addition, an application capable of performing the algorithm described with reference to FIG. 2 is installed or built-in in the form of firmware in the source device 110, the auxiliary device 120, and the target devices 131 and 132. When needed, the source device 110 may be connected to the target devices 131 and 132 in a broadband communication scheme.

The account authentication system 190 includes the random coefficient authentication key generator 191 for generating an authentication key for the target devices 131 and 132, the database 192 for storing IDs, passwords, and other personal information about users, and the account authenticator 193 for searching for personal information about a user in the database 192 and performing access authentication for the user with the target device 131. The account authentication system 190 is a kind of server that may operate in the same communication scheme as between the source device 110 and the target devices 131 and 132 or may operate over a dedicated network.

FIG. 2B is a diagram illustrating a signal flow for an access authentication method for multiple devices and platforms in the access authentication system illustrated in FIG. 2A.

Referring to FIG. 2B, upon receipt of a multiple access request, the source device 110 that has initially registered a user account to the account authentication system 190 requests an authentication key for the target device 131 to the account authentication system 190 (S210). The account authentication system 190 generates an authentication key (S211). The authentication key may be a random-number authentication key. To reinforce security, the authentication key preferably has an increased number of digits.

Subsequently, the auxiliary device 120 receives the authentication key from the account authentication system 190 (S220).

The auxiliary device 120 transmits the authentication key and an access authentication request to one of the target devices 131 and 132 registered to the auxiliary device 120 (S230). Herein, the auxiliary device 120 is connected to the target device 131 through an ad-hoc network, a WiFi network, a 3G network, ZigBee, or Bluetooth.

Upon receipt of the access authentication request, the target device 131 transmits the authentication key to the account authentication system 190 (S240). The account authentication system 190 searches the database 192 using the received authentication key (S241). When the account authentication system 190 detects the registered user account in the database 192, the account authentication system 190 transmits an access authentication completion notification to the target device 131 (S250).

Figure 3:
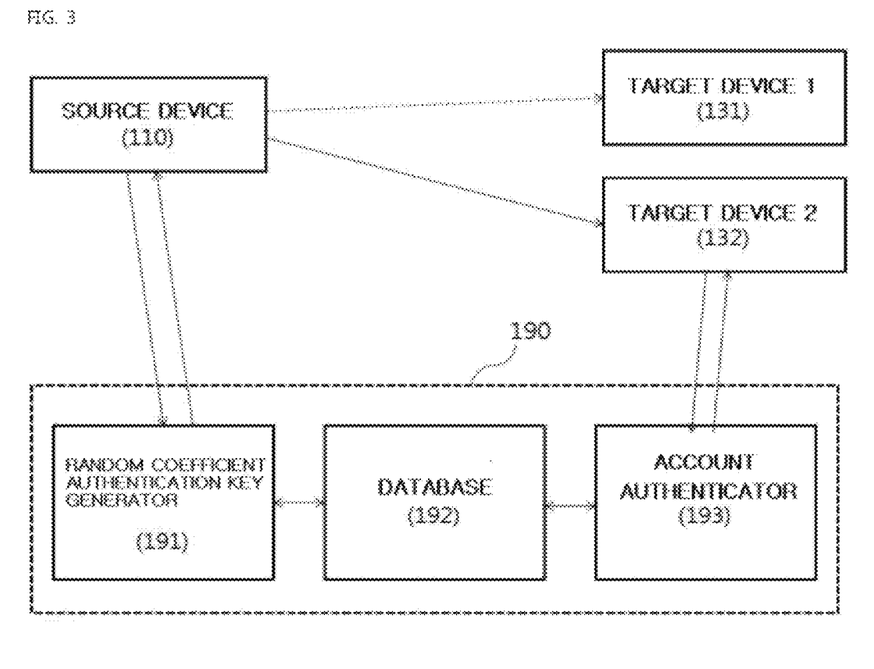
FIG. 3 is a block diagram of an access authentication system for multiple devices and platforms according to a further embodiment of the present invention.

FIG. 3 is a block diagram of an access authentication system for multiple devices and platforms according to a further embodiment of the present invention.

The access authentication system illustrated in FIG. 3 is not provided with the auxiliary device 120 and the source device 110 takes charge of a part of the functions of the auxiliary device 120. In this case, although much resources of the source device 110 are used to support access authentication of the target devices 131 and 132, portability is increased.

Figure 4:
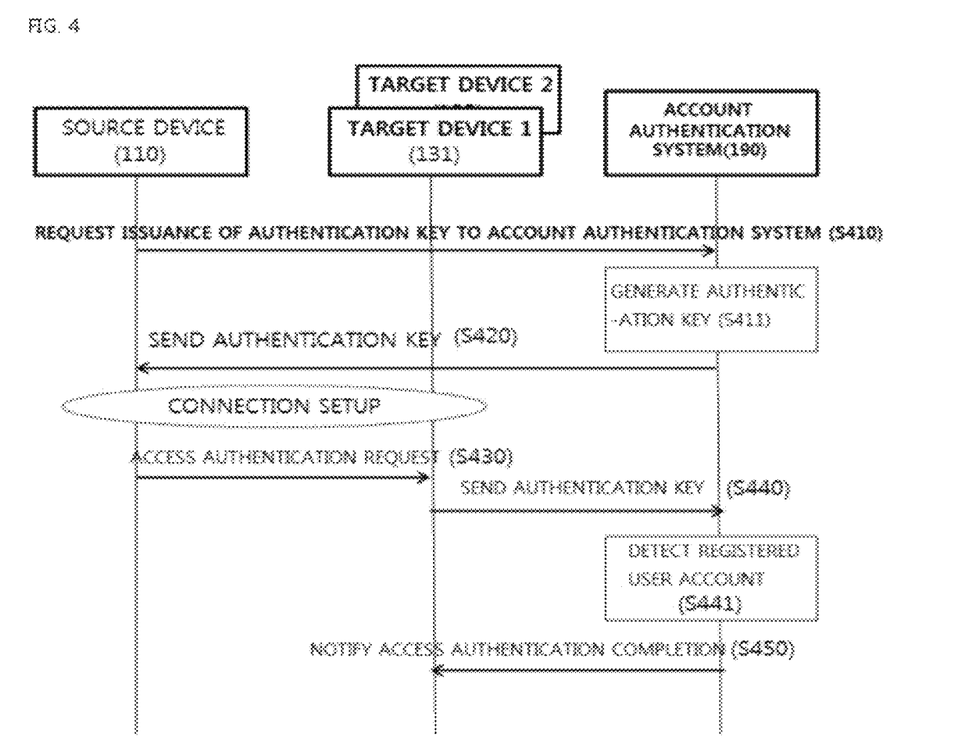
FIG. 4 is a diagram illustrating a signal flow for an access authentication method for multiple devices and platforms in the access authentication system illustrated in FIG. 3.

FIG. 4 is a diagram illustrating a signal flow for an access authentication method for multiple devices and platforms in the access authentication system illustrated in FIG. 3.

Referring to FIG. 4, upon receipt of a multiple access request, the source device 110 that has initially registered a user account to the account authentication system 190 requests an authentication key for the target device 131 to the account authentication system 190 (S410). The account authentication system 190 generates an authentication key (S411). The authentication key may be a random-number authentication key.

Subsequently, the source device 110 receives the authentication key from the account authentication system 190 (S420). Before or after this step, the source device 110 establishes a connection to the target device 131. Herein, the source device 110 is connected to the target device 131 through an ad-hoc network, a WiFi network, a 3G network, ZigBee, or Bluetooth.

The source device 110 transmits the authentication key and an access authentication request to the connected target device 131 (S430).

Upon receipt of the access authentication request, the target device 131 transmits the authentication key to the account authentication system 190 (S440). The account authentication system 190 searches the database 192 using the received authentication key (S441). When the account authentication system 190 detects the registered user account in the database 192, the account authentication system 190 transmits an access authentication completion notification to the target device 131 (S450).

Figure 5:
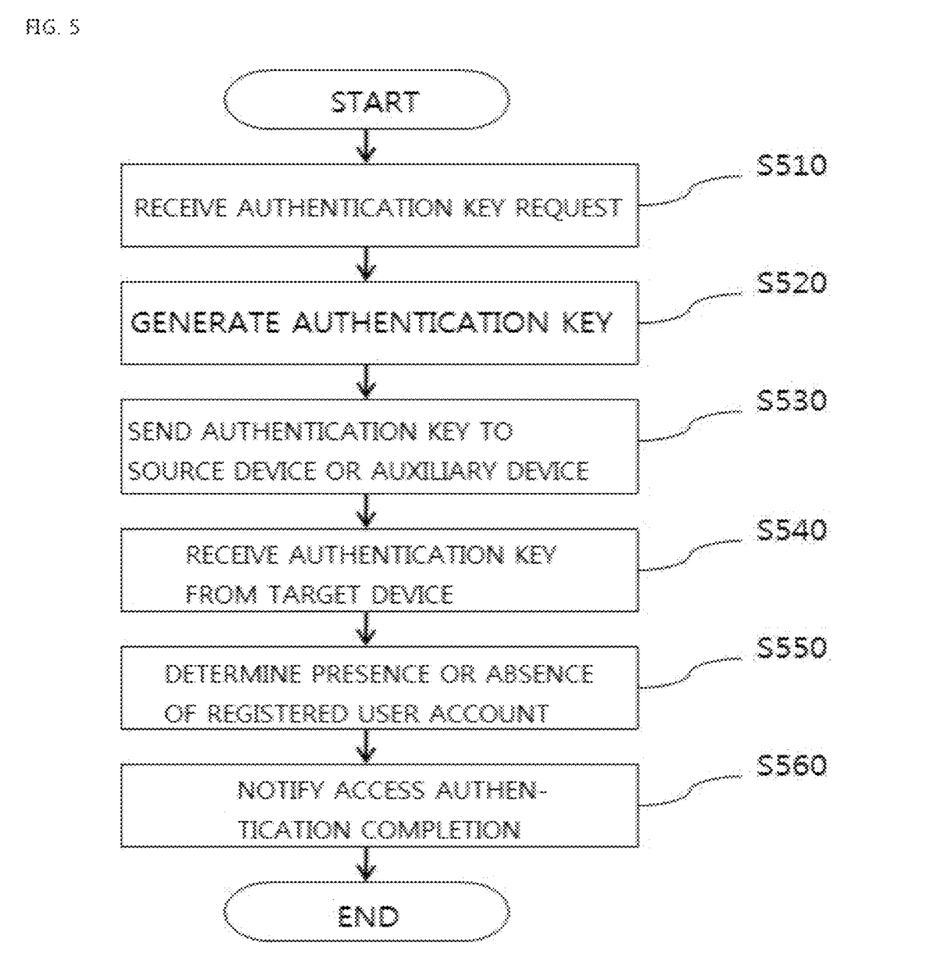
FIG. 5 is a flowchart illustrating an operation of an account authentication system.

FIG. 5 is a flowchart illustrating an operation of the account authentication system.

Referring to FIG. 5, the account authentication system 190 receives an authentication key request for the target devices 131 and 132 from the source device 110 that has initially registered a user account to the account authentication system 190 (S510).

The account authentication system 190 generates an authentication key through the random coefficient authentication key generator 191 (S520).

Then, the account authentication system 190 transmits the authentication key to one of the source device 110 and the auxiliary device 120 (S530). Upon receipt of the authentication key, the source device 110 or the auxiliary device 120 transmits an access authentication request together with the authentication key to the target device 131.

Then, the account authentication system 190 receives a request for checking the presence or absence of the registered user account along with the authentication key from the target device 131 (S540).

The account authentication system 190 determines whether there is a user account corresponding to the authentication key by searching the database 192 (S550).

When detecting the registered user account, the account authentication system 190 transmits an access authentication completion notification to the target device 131 (S560).

To reinforce security, the number of times of using an authentication key or the valid duration of the authentication key may be restricted. That is, although access authentication can be performed simultaneously for two or more target devices using one authentication key, if a predetermined number of target devices succeed in access authentication, the authentication key may be discarded.

It may further be contemplated as another embodiment of the present invention that after the account authentication system 190 transmits the access authentication completion notification, the account authentication system 190 processes the valid duration (available time period) of the authentication key as expired.

The present invention may be implemented in software. Preferably, the access authentication methods for multiple devices and platforms according to the embodiments of the present invention can be implemented as a program that can be written on a computer-readable recording medium and can thus be read by a processor. When implemented in software, the configuring means of the present invention is code segments that execute necessary tasks. The program or code segments can be written to a processor-readable recording medium, a transmission medium, or a computer data signal combined with carrier waves over a communication network.

The computer-readable recording medium may be any type of recording device in which data is stored in a computer-readable manner. Examples of the computer-readable recording medium include a ROM, a RAM, a CD-ROM, a DVD±ROM, a DVD-RAM, a magnetic tape, a floppy disc, a hard disk, an optical data storage, a flash memory, and a memory card. The computer-readable recording medium can be distributed over a plurality of computer systems connected to a network so that computer-readable code is written thereto and executed therefrom in a decentralized manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An access authentication method for multiple devices and platforms, comprising:

requesting an authentication key for a target device to an account authentication system by a source device that has initially registered a user account to the account authentication system, upon receipt of a multiple access request;

receiving the authentication key from the authentication system and transmitting an access authentication request together with the authentication key to one of target devices registered to an auxiliary device by the auxiliary device, the authentication key being a random-number authentication key, the auxiliary device being connected to the target device through one of an ad-hoc network, a Wireless Fidelity (WiFi) network, a $3^{rd}$ Generation (3G) network, ZigBee, and Bluetooth; and transmitting the authentication key to the account authentication system by the target device, so that the account authentication system determines whether there is the registered user account and performs access authentication.

2. The access authentication method according to claim 1, wherein the auxiliary device is one of a mobile phone, a smart phone, a Personal Digital Assistant (PDA), a Personal Multimedia Player (PMP), an MP3 player, a laptop computer, a smart card, and a communication device having a built-in encryption module.

3. The access authentication method according to claim 1, wherein the auxiliary device stores a list of 20 target devices to receive the authentication key and an Identifier (ID) of a target device to receive the authentication key with priority.

4. An access authentication method for multiple devices and platforms, comprising:

generating a random access authentication key and transmitting the authentication key to one of an auxiliary device that is connected to the target device through one of an ad-hoc network, a Wireless Fidelity (WiFi) network, a $3^{rd}$ Generation (3G) network, ZigBee, and Bluetooth, and a source device that has initially registered a user account to the account authentication system by the account authentication system, when the source device requests an authentication key for a target device to the account authentication system;

determining whether there is a registered user account corresponding to the authentication key by the account authentication system, upon receipt of the authentication key from the target device that has received the authentication key from the source device or the auxiliary device; and transmitting an access authentication completion notification to the target device by the account authentication system, when the account authentication system detects the registered user account.

5. The access authentication method according to claim 4, further comprising processing a valid duration of the authentication key as expired notification by the account authentication system, after transmitting the access authentication completion.

\* \* \* \* \*